United States Patent
Lattuca et al.

(10) Patent No.: US 6,956,890 B2
(45) Date of Patent: Oct. 18, 2005

(54) PROCESS AND DEVICE FOR THE GENERATION OF CODES, FOR EXAMPLE CHANNELING CODES FOR CDMA APPLICATIONS

(75) Inventors: Alessandro Lattuca, Palermo (IT); Giuseppe Avellone, Palermo (IT); Ettore Messina, Palermo (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 873 days.

(21) Appl. No.: 09/953,062

(22) Filed: Sep. 13, 2001

(65) Prior Publication Data

US 2002/0080856 A1 Jun. 27, 2002

(30) Foreign Application Priority Data

Sep. 15, 2000 (IT) .................................. TO2000A0871

(51) Int. Cl.$^7$ .................. H04B 1/707; H04B 7/216; H04L 9/00
(52) U.S. Cl. .................. 375/140; 375/130; 370/335; 380/268
(58) Field of Search ................... 375/130, 140, 375/142, 145; 370/335, 342; 360/28, 268

(56) References Cited

U.S. PATENT DOCUMENTS

| | | | | |
|---|---|---|---|---|
| 5,204,874 A | * | 4/1993 | Falconer et al. | ............. 375/130 |
| 5,920,591 A | * | 7/1999 | Fukasawa et al. | ........... 375/142 |
| 6,091,757 A | * | 7/2000 | Cudak et al. | ................ 375/130 |
| 6,233,231 B1 | * | 5/2001 | Felix et al. | ................. 370/335 |
| 6,512,753 B1 | * | 1/2003 | Ahn et al. | ................... 370/335 |
| 6,700,864 B1 | * | 3/2004 | Gerakoulis et al. | ......... 370/208 |
| 2004/0258027 A1 | * | 12/2004 | Tsybakov et al. | ........... 370/335 |

* cited by examiner

*Primary Examiner*—Stephen Chin
*Assistant Examiner*—Lawrence B. Williams
(74) *Attorney, Agent, or Firm*—Lisa K. Jorgenson; E. Russell Tarleton; Seed IP Law Group PLLC

(57) ABSTRACT

The device can be used for generating, in the framework of a CDMA communications terminal, both Walsh-Hadamard channeling codes and OVSF channeling codes. The device comprises a code generator preferably configured for generating Walsh-Hadamard codes. When the device is used for generating Walsh-Hadamard codes, the corresponding index values, applied to an input of the device, are sent to the input of the code generator. Generation of OVSF codes envisages, instead, that the corresponding indices, sent to an input of the device, undergo mapping, which enables generation, starting from the OVSF code, of the corresponding index identifying a string of symbols that is identical within the Walsh-Hadamard code. In this way each string of OVSF code symbols is generated, so producing, by means of the code generator, the generation of the identical string of symbols included in the Walsh-Hadamard code.

26 Claims, 3 Drawing Sheets

Fig. 1

PROCESS AND DEVICE FOR THE GENERATION OF CODES, FOR EXAMPLE CHANNELING CODES FOR CDMA APPLICATIONS

BACKGROUND OF THE INVENTION

1. Field of the Invention

The present invention relates to the generation of codes and has been developed with particular attention to the possible application for generating channeling codes that can be used for code-division-multiple-access (CDMA) communications.

2. Description of the Related Art

In communication systems there exist various techniques that enable access to a common channel for transmitting information according to typical multiple-access modalities.

A traditional solution envisages dividing the available channel bandwidth into a number N of sub-channels. Each user who wishes to transmit information is thus assigned a particular sub-channel. This technique is generally referred to as frequency-division multiple access (FDMA).

Another technique operates, instead, in the time domain, so that the above-mentioned division operation for enabling multiple access is performed by dividing a time interval $T_f$, commonly referred to as time frame, into a plurality of N sub-intervals which do not overlap one another, each having a duration of $T_f/N$. Each user who wishes to transmit information is thus assigned a particular time slot in the context of each frame. This technique is generally referred to as time-division multiple access (TDMA).

A further technique, which is alternative with respect to the above-mentioned FDMA and TDMA techniques, envisages enabling a number of users to share a certain channel or sub-channel by using spread-spectrum (SS) signals. With the adoption of this solution, each user is assigned an encoded channeling sequence, which is unique for each user. This sequence enables the user to distribute, or spread, the information signal over the frequency band assigned to him. In this way, the signals coming from different users can be separated at the receiver by cross-correlation between the signal received and each of the possible channeling codes assigned to the various users. If the said encoding operation is performed in such a way as to have relatively small cross-relations, it is possible to minimize the crosstalk during demodulation of the signals received from different transmitters. This multiple-access technique goes by the name of code-division multiple access (CDMA).

In CDMA applications, the users access the channel in a random way, so that the various signal transmissions are prone to overlapping completely both in time and in frequency. In the receiver, the operation of separation demodulation of these signals is rendered possible in so far as the signal is spread in frequency through the channeling code.

For example, with reference, for simplicity of illustration, to the case in which four users are present, it is possible to implement a CDMA multiple-access scheme using four channeling codes, each comprising four binary figures. Each user is thus able to distribute, or spread, his signal, which leads to the formation of four spread-spectrum signals, which are found, in any case, to be mutually orthogonal when superimposed to form a CDMA signal. At the receiver, the regenerated composite signal is received, and the signal corresponding to each user can be separated from the others by exploiting, precisely, the orthogonality of the corresponding encodings.

The foregoing corresponds to criteria that are well known in the state of the art and, as such, do not require any more detailed description herein.

In brief, a transmitter operating in a CDMA system uses the channeling codes for sharing the common propagation channel. On the other hand, the receiver (Terminal Equipment, or briefly TE) must be in a condition to generate all the channeling codes used so as to demodulate the signals received by the various transmitters, separating them from one another.

If the transmission speeds currently used are considered (for example, 3.84 MHz in the Universal Mobile Telecommunication System (UMTS) standard), the said speed being moreover bound to increase over time, it is important to be able to generate the codes in question in a simple and fast way, without giving rise to excessively high levels of power consumption, above all taking into account the need to operate in the context of mobile terminals.

The present invention has been developed with particular attention paid to its possible application to two classes of channeling codes currently referred to as the Walsh-Hadamard (in brief, WH) code and the Orthogonal-Variable-Spreading-Factor (OVSF) code.

For general information on the WH codes, useful reference may be made to J. Proakis, "Digital Communications," McGraw-Hill, p. 422 et seq. and Roger L. Peterson, "Introduction to Spread Spectrum Communication," Prentice Hall, p. 542 et seq.

For general information on the OVSF codes and the UMTS standard, reference may be made to Standard 3G TS 25.213 V3.2.0 UMTS Standard Document, Release 2000–03.

The invention can, however, be applied in general to all the codes that present the same characteristics as the WH and OVSF codes, to which reference will be made in what follows.

The particular attention paid to these two types of channeling codes is due to the fact that they have been chosen in view of their possible utilization in the framework of the UMTS standard referred to previously.

As further clarification, FIG. 1 is a comparative illustration of the characteristics of the WH channeling code (FIG. 1A) and the OVSF channeling code (FIG. 1B) for values of length L equal to 2, 4 and 8, respectively.

In general both the WH codes and the OVSF codes may be viewed as a vector function of two variables, namely:

the length (L), and the index (I=0 at L−1).

The length is in general a power of 2 (i.e., $2^n$, with n integer), and each code may be viewed as corresponding to the i-the row of a corresponding WH/OVSF matrix in which each element of the matrix is an antipodal binary number (i.e., ±1).

In the solutions up to now proposed for the generation of codes, such as the WH and OVSF codes, the generation of the codes themselves is envisaged in an altogether independent way.

It happens, on the other hand, that the generation of the WH code is simpler (and hence less burdensome in terms of circuit complexity), requiring typically—for instance, for a code of length L=8—a circuit complexity in the region of 200 gates.

Generation of the OVSF code is in general more burdensome. For example, there has recently been proposed a solution whereby, to generate an OVSF code of length L=8, a circuit having a complexity in the region of 400 gates is used.

In certain applications there arises, however, the need to generate both codes.

For example, with reference to the UMTS application already mentioned more than once previously, the US standards (for instance, the standard IS95CDMA) envisage the use of WH codes, whereas in the European context the use of OVSF codes has prevailed for the very same application.

In order to create systems, in particular systems of mobile terminals, that are able to operate with different standards, it is therefore important to have available solutions that enable generation of both codes in a simple and fast way, reducing energy consumption to a minimum, at the same time avoiding the need to resort to a solution of a purely additive nature, based upon the use of a first generator for producing WH codes and a second generator (distinct from the first) for producing OVSF codes; i.e., a solution which, with reference to the orders of circuit complexity discussed previously, would entail the use of circuits having a circuit complexity in the region of 600 logic gates.

SUMMARY OF THE INVENTION

The disclosed embodiments of the present invention provide a solution that overcomes the drawbacks and difficulties referred to previously.

Essentially, the solution according to the invention is based upon recognition of the fact that codes, such as the WH codes and the OVSF codes (it is to be remembered that this property, albeit encountered in the two codes referred to, is not exclusive to these two codes), differ from one another only with respect to the row position of each code in the framework of the respective matrix. In other words, the present invention exploits the possible existence of:

a first code (in the exemplary embodiment illustrated in what follows, the OVSF code) comprising a set of strings of symbols, each string of symbols of the said set having a given length (L) and being identified by a given index (I);

a second code (in the example of embodiment illustrated in what follows, the WH code) comprising a corresponding set of respective strings of symbols, the respective strings of symbols of said corresponding set being each identical to a string of symbols of said one code and being identified by a respective corresponding index (I) of said another code.

The above results in the possibility of determining, for the given index identifying each string of symbols of the first code, the respective corresponding index that identifies the identical string of the second code.

This fact may be immediately appreciated from FIG. 2 if it is noted that, for the length L=2, the two codes WH and OVSF in effect correspond to one another, whilst the matrices corresponding to the code lengths L=4 and L=8 present rows of identical content, with the sole difference represented by the possible location in different positions.

For example, with reference for reasons of simplicity to the length L=4, it may at once be noted that, in the two matrices representing, in one case, the WH code (FIG. 1A) and, in the other case, the OVSF code (FIG. 1B), the first and the last rows are identical to one another, whereas the second and third rows are inverted with respect to one another, with the second row of the matrix of the WH code corresponding to the third row of the matrix of the OVSF code, and the third row of the matrix of the WH code corresponding to the second row of the matrix of the OVSF code.

The same considerations apply identically in the case of the length L=8. It will be appreciated, for example, that also in this case the first and last rows of the matrices (indices 0 and 7) of the two codes are identical to one another, whereas, for example, the second row (index 1) of the matrix of the WH code corresponds to the fifth row (index 4) of the matrix of the OVSF code.

Substantially, then, the disclosed embodiments of the invention are based on the recognition of the fact that, if it is necessary to generate two codes that present the aforesaid characteristic, it is possible to resort to a solution in which a single code generator is used (which generates the strings of binary numbers corresponding to the various rows of the respective matrices), and this generator is switched from the function for generating the first code to the function for generating the second code simply by modifying the index that identifies each specific string in the context of the respective matrix.

BRIEF DESCRIPTION OF THE DRAWINGS

The embodiments of the invention will now be described, purely by way of non-limiting example, with reference to the attached drawings, in which:

FIG. 1, which is an illustration of the general properties of the WH and OVSF codes, has already been described previously;

DETAILED DESCRIPTION OF THE INVENTION

Figure 2:
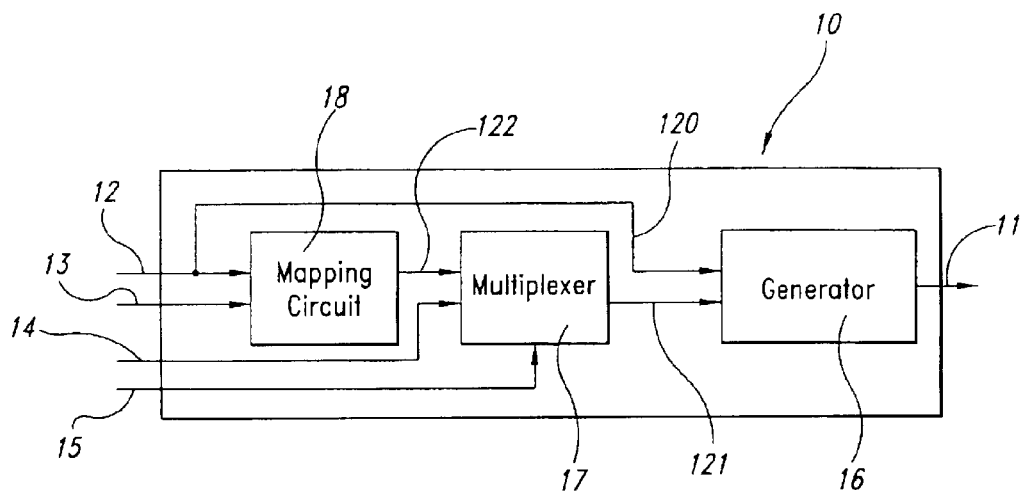
FIG. 2 illustrates, in the form of a block diagram, the typical architecture of a device for the generation of WH/OVSF codes operating according to the invention.

Basically, the device represented in FIG. 2, designated as a whole by 10, enables generation on its output 11 alternatively of Walsh-Hadamard (WH) codes and of OVSF codes, according to four input parameters:

the length L of the code to be generated, supplied on a first input 12;

the index of the OVSF code that is to be generated, supplied on an input 13;

the index of the WH code that is to be generated, supplied on an input 14; and a selection signal, presented on an input 15, which indicates the fact that the code to be generated is an OVSF code or a WH code.

The function of generating the codes is performed by a generator module 16 (of a type in itself known), which is essentially a Walsh-Hadamard code generator.

As has already been said in the introductory part of the present description, all other parameters being the same, the generation of WH codes proves simpler (in terms of burden on circuitry) than the generation of OVSF codes.

From this standpoint, the currently preferred embodiment of the present invention exploits precisely the possibility of using the same generator (and the one having the simplest structure) for generating both types of code.

The generator 16 operates according to two input parameters consisting, respectively, of the length L, received on the branch 120 of the input line 12, and of the corresponding index identifying the WH code (i.e., the row of the matrix) that is to be generated. The parameter is received on a corresponding input line designated by 121.

Figure 3:
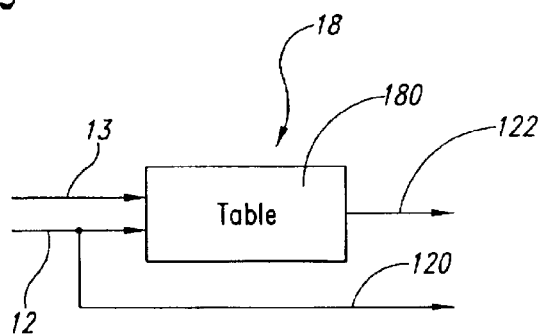
FIGS. 3 to 5 illustrate three different possible embodiments of one of the elements illustrated in FIG. 2.
Figure 4:
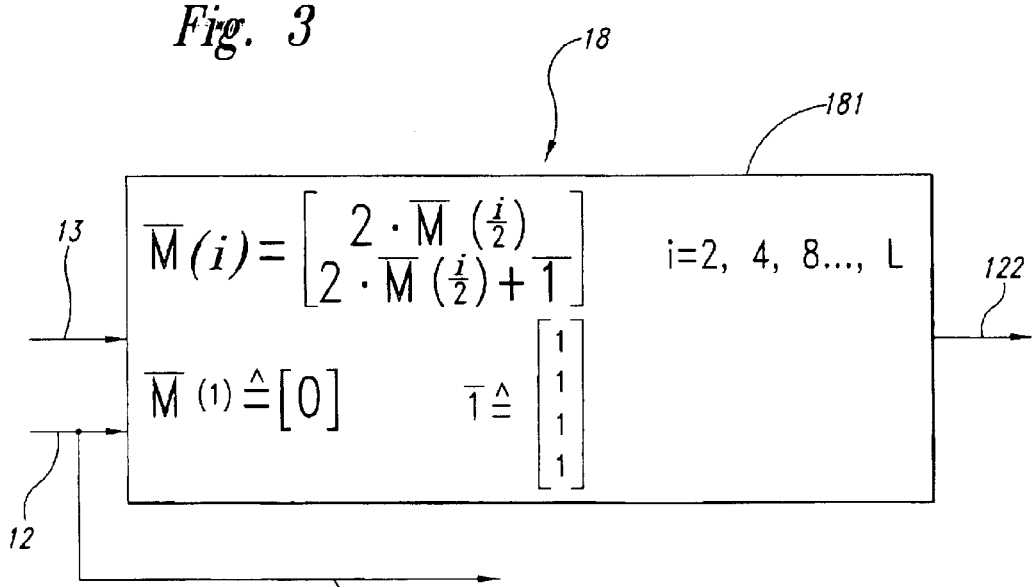
Figure 5:
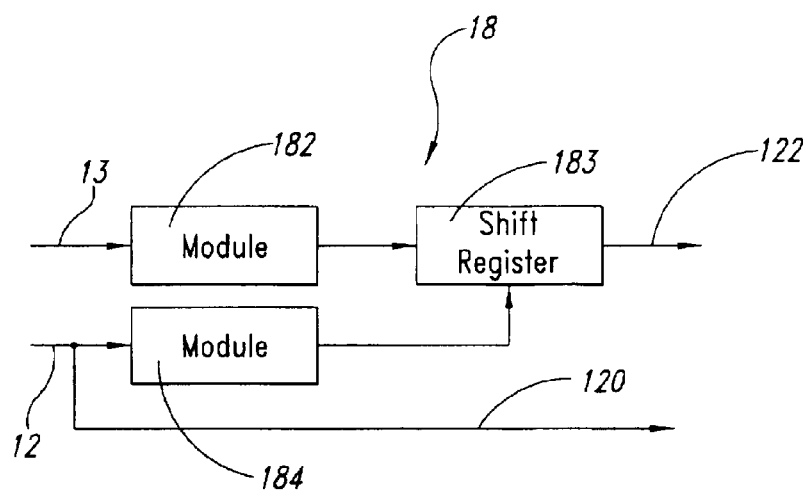

The remaining parts of the device 10 represented in FIG. 2 consist basically of a multiplexer 17 and a mapping circuit 18, the latter being implementable by resorting to the various solutions described in what follows with reference to FIGS. 3 to 5.

The function of the multiplexer 17 is essentially that of transferring, onto the input line 121 of the generator 16:

when the signal present on the input 15 indicates that the device 10 must generate a WH code, simply the WH index received on the input 14; or when the signal present on the input line 15 indicates that the device 10 is to generate an OVSF code, another "mapped" index (generated according to the criteria illustrated in greater detail in what follows) present on a line 122 coming from the module 18.

The diagram of FIG. 3 illustrates a possible first embodiment of the module 18.

In this case, the heart of the module 18 simply consists of a look-up table LUT 180, usually implemented in the form of a RAM or an equivalent component, in which the correspondence between the OVSF indices and the WH indices is stored.

Figure 1:
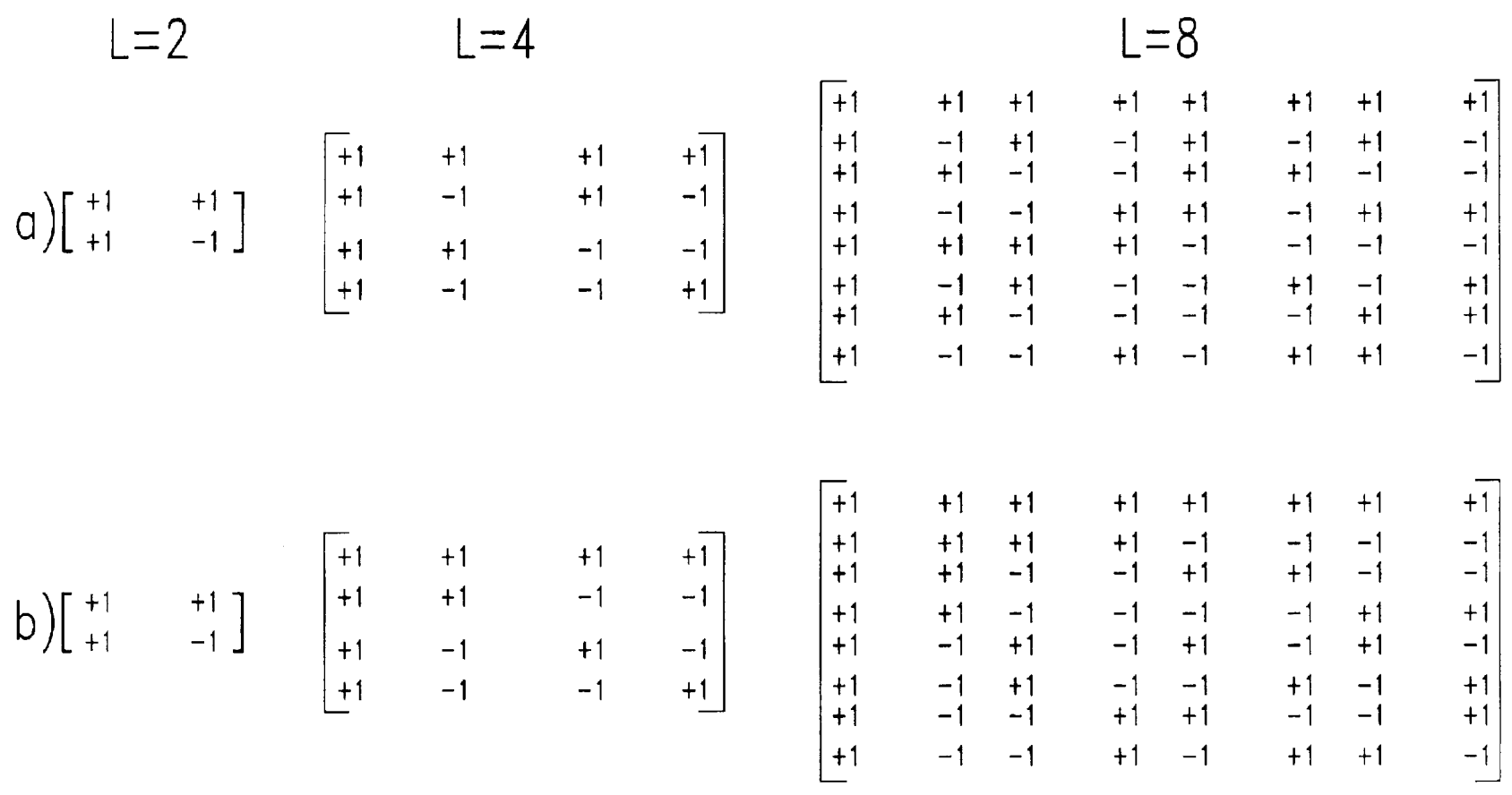

For example, with reference again to FIG. 1, and in particular to the matrices corresponding to the length L=4, in the table 180 there is stored the fact that, for instance, the OVSF code of index 2 (third row in the corresponding matrix of FIG. 1B) corresponds to the WH code of index 1 (second row of the matrix of FIG. 1A).

Consequently, when the device 10 is driven for generating, for example, the OVSF code of index 2 (third row of the corresponding matrix), the module 18 (here represented by the table 180) converts the index 2 of the OVSF code into the index 1 of the WH code, transmitting the corresponding input to the generator 16. The latter acts as if it were to generate the WH code of index 1, whereas the device 10, as a whole, "sees" the code generated as an OVSF code of index 2.

Likewise, again with reference to FIG. 1, assuming that we wish to generate the OVSF code of index 4 (fifth row of the respective matrix), the corresponding input datum fed on the line 13 of the table 180 is converted, on the output 122, as mapped index of value 1 of the WH code. Also in this case, the generator 16 generates the corresponding code (in particular, as WH code of index 1—second row of the respective matrix), whilst this operation is "seen," as a whole, by the device 10 as the generation of the OVSF code of index 4 and length 8.

In other words, when a command is sent to the device 10, by acting on the line 15, so as to generate the WH codes, the module 18 is, in effect, inactive, in so far as the multiplexer 17 simply transfers the indices applied on the input 14 to the input 121 of the generator 16.

Instead, when (as a result of a variation in the value of the signal present on the line 15) the device 10 is converted to generating OVSF codes, the module 18 enters into play, causing the indices of the OVSF code supplied on the input 13 to be "mapped," i.e., converted, into WH indices which correspond to the generation of an identical code string, producing, as a result of the application of the mapped indices on the input 121, the corresponding action by the generator 16.

It will moreover be appreciated that, in the case of certain indices, the aforesaid mapping action can amount to a pure and simple identity (see, for example, in addition to matrix L=2, the first and last rows of the matrices L=4 and L=8 represented in FIG. 1, where the said rows, corresponding to the indices 0 and 3, or 0 and 7, are identical for the WH code and for the OVSF code).

Performing the above-mentioned mapping operation (conversion of the OVSF index presented on the input 13 into the corresponding WH index issued on the line 122) by means of a pure and simple conversion table can prove burdensome in terms of circuit implementation, above all as the value L increases. For this reason, FIG. 4 refers to a variant embodiment in which the aforesaid action of mapping is performed by means of an algorithm which can be implemented by a processing module 181. The latter may, for instance, consist of a dedicated processing function in the framework of a more complex processing unit (in this connection, see also the diagram of FIG. 6). In practice, the algorithm implemented is the one that can be expressed in the following form:

$$\overline{M}(i) = \begin{bmatrix} 2 \cdot \overline{M}(\frac{i}{2}) \\ 2 \cdot \overline{M}(\frac{i}{2}) + \overline{1} \end{bmatrix} \quad i = 2, 4, 8, \ldots, L$$

$$M(1) = [0] \qquad 1 = [1\ 1\ \ldots\ 1]$$

where 1 is a column vector of i elements equal to 1.

In what follows an example is given of the generation of the mapping vector in the case where L=8.

$L = 8 \Rightarrow i = 2, 4, 8$

– STEP 1

$M(2) = [0$
$\quad\quad\quad 1]$

– STEP 2

$M(4) = [2M(2)$
$\quad\quad\quad 2M(2) + 1] = [0$
$\quad\quad\quad\quad\quad\quad\quad\quad\quad 2$
$\quad\quad\quad\quad\quad\quad\quad\quad\quad \ldots$
$\quad\quad\quad\quad\quad\quad\quad\quad\quad 1$
$\quad\quad\quad\quad\quad\quad\quad\quad\quad 3]$

– STEP 3

$M(8) = [2M(4)$
$\quad\quad\quad 2M(4) + 1] = [0$
$\quad\quad\quad\quad\quad\quad\quad\quad\quad 4$
$\quad\quad\quad\quad\quad\quad\quad\quad\quad 2$
$\quad\quad\quad\quad\quad\quad\quad\quad\quad 6$
$\quad\quad\quad\quad\quad\quad\quad\quad\quad \ldots$
$\quad\quad\quad\quad\quad\quad\quad\quad\quad 1$
$\quad\quad\quad\quad\quad\quad\quad\quad\quad 5$
$\quad\quad\quad\quad\quad\quad\quad\quad\quad 3$
$\quad\quad\quad\quad\quad\quad\quad\quad\quad 7]$ The latter vector represents the mapping vector resulting from application of the algorithm.

The main advantage linked to recourse to an algorithmic solution (which, of course, may be advantageously integrated with the solution based on the use of a look-up table, as illustrated in FIG. 3) lies in the fact that it makes possible a certain degree of reduction in the memory space occupied, in any case enabling generation of all the mapping indices necessary for filling in the table, such as the table 180 illustrated in FIG. 3.

A further advantage is linked to the fact that recourse to an algorithm enables easier adaptation to possible variations in the length L.

Basically, the input datum i corresponds to the value of length L. The algorithm enables generation of a vector of indices, the vector of which gathers together the mapping indices corresponding to a certain length of OVSF code. Consequently, if the value of L changes, the mapping vector must be recalculated. The length L is then used in the algorithm to calculate the vector, whilst the OVSF index represents the row position within the vector. Each element of the vector corresponds to the desired mapping-index value.

Yet another solution of embodiment of the mapping module 18 is the one represented in FIG. 5.

Here, the bit string representing the OVSF index presented on the input 13 feeds a module 182, which performs inversion of the position of the bits of the binary string that identifies the index in question. In practice, by means of the inversion operation, the most significant bit (MSB) becomes the least significant bit (LSB), and vice versa. The input 12 feeds a module 184 that in turn feeds a shift register 183.

The bit string thus inverted feeds a shift register 183 which performs a shift thereof (with reset) towards the right by n positions. The number n is identified by the following relation:

$$n = A - \log_2 L.$$

In the above relation, the parameter L denotes the length of the code strings, whilst the quantity A corresponds to the number of bits necessary for representing the maximum code length that is to be generated (for example, 9 bits if the maximum code-word length is equal to 512, i.e., $2^9$).

The variant embodiment represented in FIG. 5 is evidently characterized as the one having the lowest requirements in terms of occupation of storage space, in so far as, at least virtually, the mapping of the OVSF index in the corresponding WH index can be carried out just when required, practically in real time.

Figure 6:
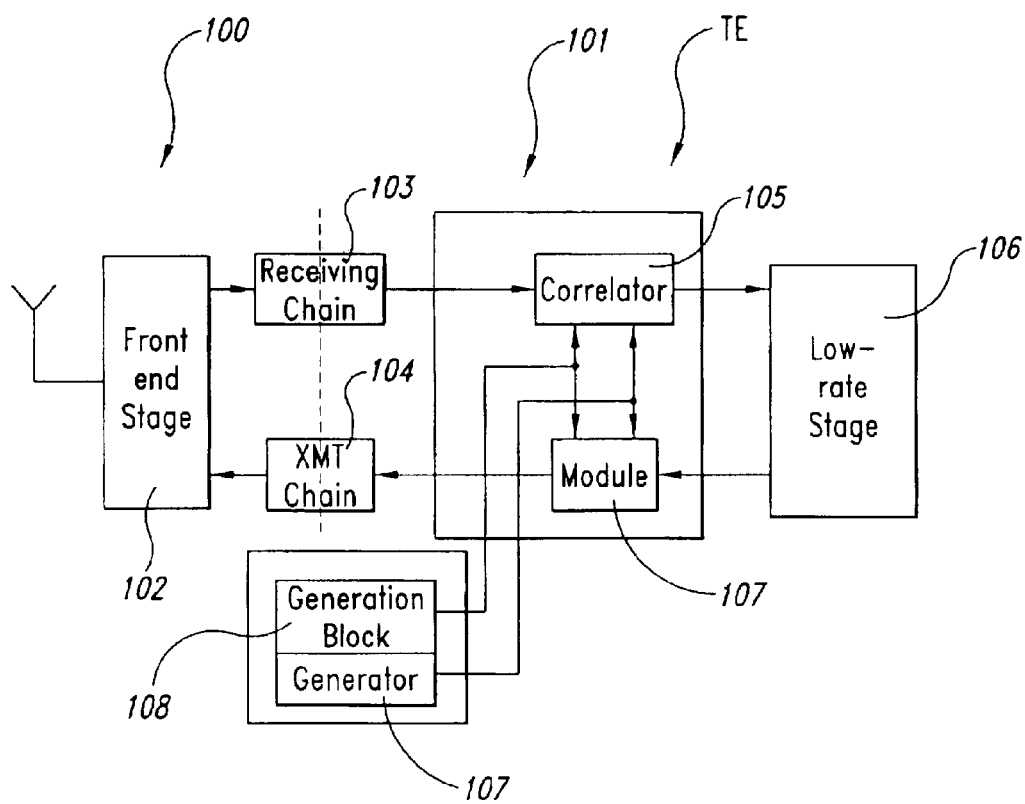
FIG. 6 illustrates, again in the form of a block diagram, the possible location of a device according to the invention within a terminal TE of a CDMA system.

Finally, the diagram of FIG. 6 represents a possible architecture of terminal equipment TE which can be used in the framework of a CDMA system based upon the use of the present invention.

Basically, the terminal TE of FIG. 6 may be viewed as ideally divided into an analog section 100 and a digital section 101.

The analog section in general comprises the radio-frequency front-end stage 102 (built according to known criteria, which consequently do not need to be illustrated herein) under which there come the receiving chain 103 and the transmitting chain 104, which also comprise (according to known criteria) a radio-frequency interface section and a conversion section.

In particular, in the receiving chain 103 the signal is converted into baseband and digitized in the receiving conversion stage. The digital signal then undergoes de-spreading in a bank of correlators 105 in order to obtain the reception signal that is to feed the low-rate stage 106 of the transceiver.

In a dual way, the encoded signal coming from the stage 106 is subjected to spreading in corresponding modules 107 in view of its subsequent frequency modulation and conversion upwards performed in the transmission chain 104.

Both the correlators 105 and the spreading modules 106 operate according to two types of codes, i.e., the scrambling codes (typical of the spread-spectrum scheme used, generated in a corresponding generator 107) and the CDMA channeling codes (generated in a corresponding generation block 108, the core of which is precisely represented by the device 10 illustrated in FIG. 2).

In particular, the digital transceiver section can be divided into two sub-stages operating at different rates, namely, one sub-stage with a high sampling rate (approximately 10 MHz, in the case of the UMTS standard) and the other sub-stage with a low sampling rate (up to 500 kHz for FDD UMTS processing operations).

It will in general be appreciated that the device designed to supervise the generation of the channeling codes usually constitutes a part in common of both the transmission chain and the receiving chain. The channeling codes are used for the functions of spreading and de-spreading the information signal. Consequently, the corresponding generator 108 is connected both to the correlators 105 and to the modules 106.

Preferably, the location of the device for generating channeling codes is in the part of the transceiver that operates at the highest speed.

Of course, without prejudice to the principle of the invention, the details of construction and the embodiments may vary widely with respect to what is described and illustrated herein purely by way of example, without thereby departing from the scope of the present invention as defined in the ensuing claims and the equivalents thereof.

What is claimed is:

1. A process for generating a first code having a set of strings of symbols, each string of symbols of said set having a given length and being identified by a given index, comprising the following operations:

providing a generator capable of generating a second code comprising a corresponding set of respective strings of symbols; the respective strings of symbols of said second code being each identical to a string of symbols of said first code and being identified by a respective corresponding index of said second code;

determining, for the given index identifying each string of symbols of said first code, a respective corresponding index identifying the identical string of said second code; and generating each string of symbols of said first code starting from the respective given index, generating, by means of said generator, the identical string of said second code; said generator generating said identical string according to the respective corresponding index determined starting from said respective given index.

2. The process of claim 1, wherein said first code and said second code are codes with characteristics of orthogonality.

3. The process of claim 2, wherein said first code and said second code are channeling codes for CDMA transmissions.

4. The process of claim 1, wherein said first code and said second code are chosen in the group made up of the Walsh-Hadamard codes and the OVSF codes.

5. The process of claim 4, wherein said first code is an OVSF code and said second code is a Walsh-Hadamard code.

6. The process of claim 1 comprising the operation of creating a correspondence table between the given indices identifying the strings of symbols of said first code and the corresponding indices identifying the identical strings of symbols of said second code.

7. The process of claim 4 wherein the given indices of said Walsh-Hadamard code are determined starting from the given indices of said OVSF code according to the relation $$\overline{M}(i) = \begin{bmatrix} 2 \cdot \overline{M}\left(\frac{i}{2}\right) \\ 2 \cdot \overline{M}\left(\frac{i}{2}\right) + \overline{1} \end{bmatrix} \quad i = 2, 4, 8, \ldots, L$$

$$M(1) = [0] \qquad \overline{1} = [1 \ 1 \ \ldots \ 1]$$

where:

$\overline{1}$ is a column vector of i elements equal to 1;

L is the given length of the strings of the code symbols;

M(i) is a vector that groups together the mapping values of the indices corresponding to a given length of the OVSF code; and the OVSF index represents the row position within the vector.

8. The process of claim 4 wherein the indices of said Walsh-Hadamard code are determined starting from said OVSF code through the following operations:

expressing the OVSF index as a binary number;

inverting the order of the bits of said binary number;

subjecting the inverted binary number obtained from the inversion of the order of the bits to a right-hand shift with reset of n positions, where n is identified by the following relation:

$$n = A - \log_2 L$$

where L denotes the length of the code strings, and A is the number of bits necessary for representing the maximum length of code to be generated, the further binary number obtained by means of said right-hand shift expressing the corresponding index of the Walsh-Hadamard code.

9. A device for generating a first code comprising a set of strings of symbols, each string of symbols of said set having a given length and being identified by a given index, the device comprising:

a code generator for generating a second code comprising a corresponding set of respective strings of symbols; the respective strings of symbols of said second code being each identical to a string of symbols of said first code and being identified by a respective corresponding index of said second code; and a mapping circuit for determining, for the given index identifying each string of symbols of said first code, the respective corresponding index identifying the identical string of said second code;

the device generating each string of symbols of said first code starting from the respective given index, generating, by means of said code generator, the identical string of said second code according to the corresponding index determined starting from said given index by means of said mapping circuit.

10. The device of claim 9 wherein said first code and said second code are codes with characteristics of orthogonality.

11. The device according to claim 10 wherein said first code and said second code are channeling codes for CDMA transmissions.

12. The device of claim 9 wherein said first code and said second code are chosen in the group made up of the Walsh-Hadamard codes and the OVSF codes.

13. The device of claim 12 wherein said code generator is a Walsh-Hadamard code generator and said mapping circuit is configured to determine, starting from each given index that identifies a string of symbols of an OVSF code, the respective corresponding index that identifies the identical string of symbols in a Walsh-Hadamard code.

14. The device of claim 9 wherein said mapping circuit comprises a memory element in which there is stored a table of correspondence between the given indices of said first code and the respective corresponding indices of said second code.

15. The device of claim 12 wherein said mapping circuit comprises a computation module for determining the indices identifying the strings of symbols of said Walsh-Hadamard code starting from the given indices of said OVSF code according to the relation $$\overline{M}(i) = \begin{bmatrix} 2 \cdot \overline{M}\left(\frac{i}{2}\right) \\ 2 \cdot \overline{M}\left(\frac{i}{2}\right) + \overline{1} \end{bmatrix} \quad i = 2, 4, 8, \ldots, L$$

$$M(1) = [0] \qquad \overline{1} = [1 \ 1 \ \ldots \ 1]$$

where:

$\overline{1}$ is a column vector of i elements equal to 1;

L is the given length of the strings of the code symbols;

M(i) is a vector that groups together the mapping values of the indices corresponding to a given length of the OVSF code; and the OVSF index represents the row position within the vector.

16. The device of claim 12 wherein said mapping circuit comprises:

a first module for storing the indices that identify the strings of symbols of said OVSF code as a binary number;

an inversion and shift module for subjecting to inversion of the order of bits said binary number, then subjecting the inverted binary number thus obtained to a right-hand shift with reset of n positions, the further binary number obtained by means of said shift expressing in binary form the respective corresponding index identifying the identical bit string in said Walsh-Hadamard code; and a further computation module for determining the value n of the positions involved in said right-hand shift with reset starting from the relation $$n = A - \log_2 L$$

where L denotes the length of the code strings, and A is the number of bits necessary for representing the maximum length of the code to be generated.

17. The device of claim 9 comprising a selector capable of activating said code generator alternatively in a first operating condition and in a second operating condition, in which said code generator respectively generates:

the strings of symbols of said second code starting from the respective corresponding indices that identify the strings of symbols of said another code; and the strings of symbols of said first code in the form of strings identical to said second code; said identical strings being generated using the corresponding indices determined by said mapping circuit starting from the given indices identifying the strings of said first code.

18. The device of claim 9 wherein said device is integrated in a single block for generating the codes with a scrambling code generator in a terminal for CDMA communications.

19. The device of claim 9 comprising a terminal for CDMA communications, the device configured for co-operating both with receiving chain and with a transmission chain of said terminal.

20. The device of claim 19, configured for co-operating both with correlators included in the receiving chain of the terminal and with spreading modules included in the transmission chain of the terminal.

21. A process for generating codes used in CDMA communications, comprising:
 receiving a signal indicative of a length of code to be generated, an OVSF index signal, a Walsh-Hadamard index signal, and a selection signal;
 mapping the OVSF index signal into a corresponding Walsh-Hadamard index signal using a look-up table;
 selecting one of the Walsh-Hadamard index signal and the corresponding Walsh-Hadamard index signal in response to the selection signal; and
 generating the Walsh-Hadamard code corresponding to the selected index signal.

22. A process for generating codes used in CDMA communications, comprising:
 receiving a signal indicative of a length of code to be generated, an OVSF index signal, a Walsh-Hadamard index signal, and a selection signal;
 mapping the OVSF index signal into a corresponding Walsh-Hadamard index signal by applying the following relation:

$$\overline{M}(i) = \begin{bmatrix} 2 \cdot \overline{M}\left(\frac{i}{2}\right) \\ 2 \cdot \overline{M}\left(\frac{i}{2}\right) + \overline{1} \end{bmatrix} \quad i = 2, 4, 8, \ldots, L$$

$$M(1) = [0] \qquad \overline{1} = [1 \ 1 \ \ldots \ 1]$$

where:
 1 is a column vector of i elements equal to 1;
 L is the given length of the strings of the code symbols;
 M(i) is a vector that groups together the mapping values of the indices corresponding to a given length of the OVSF code; and
 the OVSF index represents the row position within the vector;
 selecting one of the Walsh-Hadamard index signal and the corresponding Walsh-Hadamard index signal in response to the selection signal; and
 generating the Walsh-Hadamard code corresponding to the selected index signal.

23. A process for generating codes used in CDMA communications, comprising:
 receiving a signal indicative of a length of code to be generated, an OVSF index signal, a Walsh-Hadamard index signal, and a selection signal;
 mapping the OVSF through the following operations:
 expressing the OVSF index signal as a binary signal;
 inverting the order of bits in the binary signal; and
 subjecting the inverted binary signal obtained from the inversion of the order of the bits to a right-hand shift with reset of n positions, where n is identified by the following relation:

$n = A - \log_2 L;$ where L denotes the length of the code strings, and A is the number of bits necessary for representing the maximum length of code to be generated,
 the further binary number obtained by means of said right-hand shift expressing the corresponding index of the Walsh-Hadamard code;
 selecting one of the Walsh-Hadamard index signal and the corresponding Walsh-Hadamard index signal corresponding to the selection signal; and
 generating the Walsh-Hadamard code corresponding to the selected index signal.

24. A device for generating codes used in CDMA communications, comprising:
 a first input for receiving a signal indicative of the length of code to generate, a second input to receive an OVSF index signal, a third input to receive a Walsh-Hadamard index signal, and a fourth input to receive a selection signal;
 a mapping circuit configured to receive the OVSF index signal and to map the OVSF index signal into a corresponding Walsh-Hadamard index signal by using a look-up table;
 a selection circuit configured to receive the Walsh-Hadamard index signal from the third input, and the corresponding Walsh-Hadamard index signal from the mapping circuit, and the selection signal from the fourth input, and further configured to output one of either the Walsh-Hadamard index signal and the corresponding Walsh-Hadamard index signal in response to the selection signal; and
 a generator configured to receive from the first input the signal indicative of the length of code to generate, to receive the selected one of the Walsh-Hadamard index signal and the corresponding Walsh-Hadamard index signal from the selection circuit, and to generate the Walsh-Hadamard code corresponding to the selected index signal.

25. A device for generating codes used in CDMA communications, comprising:
 a first input for receiving a signal indicative of the length of code to generate, a second input to receive an OVSF index signal, a third input to receive a Walsh-Hadamard index signal, and a fourth input to receive a selection signal;
 a mapping circuit configured to receive the OVSF index signal and to map the OVSF index signal into a corresponding Walsh-Hadamard index signal according to the relation:

$$\overline{M}(i) = \begin{bmatrix} 2 \cdot \overline{M}\left(\frac{i}{2}\right) \\ 2 \cdot \overline{M}\left(\frac{i}{2}\right) + \overline{1} \end{bmatrix} \quad i = 2, 4, 8, \ldots, L$$

$$M(1) = [0] \qquad \overline{1} = [1 \ 1 \ \ldots \ 1]$$

where:
 1 is a column vector of i elements equal to 1;
 L is the given length of the strings of the code symbols;
 M(i) is a vector that groups together the mapping values of the indices corresponding to a given length of the OVSF code; and
 the OVSF index represents the row position within the vector;
 a selection circuit configured to receive the Walsh-Hadamard index signal from the third input, and the corresponding Walsh-Hadamard index signal from the mapping circuit, and the selection signal from the fourth input, and further configured to output one of either the Walsh-Hadamard index signal and the corresponding Walsh-Hadamard index signal in response to the selection signal; and a generator configured to receive from the first input the signal indicative of the length of code to generate, to receive the selected one of the Walsh-Hadamard index signal and the corresponding Walsh-Hadamard index signal from the selection circuit, and to generate the Walsh-Hadamard code in response thereto.

26. A device for generating codes used in CDMA communications, comprising:

a first input for receiving a signal indicative of the length of code to generate, a second input to receive an OVSF index signal, a third input to receive a Walsh-Hadamard index signal, and a fourth input to receive a selection signal;

a mapping circuit configured to receive the OVSF index signal and to map the OVSF index signal into a corresponding Walsh-Hadamard index signal in accordance with the following operations:

expressing the OVSF index as a binary number;
inverting the order of the bits of said binary number;
subjecting the inverted binary number obtained from the inversion of the order of the bits to a right-hand shift with reset of n positions, where n is identified by the following relation:

$$n = A - \log_2 L$$

where L denotes the length of the code strings, and A is the number of bits necessary for representing the maximum length of code to be generated, the further binary number obtained by means of said right-hand shift expressing the corresponding index of the Walsh-Hadamard code;

a selection circuit configured to receive the Walsh-Hadamard index signal from the third input, and the corresponding Walsh-Hadamard index signal from the mapping circuit, and the selection signal from the fourth input, and further configured to output one of either the Walsh-Hadamard index signal and the corresponding Walsh-Hadamard index signal in response to the selection signal; and a generator configured to receive from the first input the signal indicative of the length of code to generate and the selected one of the Walsh-Hadamard index signal and the corresponding Walsh-Hadamard index signal from the selection circuit and to generate the Walsh-Hadamard code that corresponds to the selected index signal.

* * * * *